United States Patent [19]

Higashino et al.

[11] Patent Number: 4,607,614

[45] Date of Patent: Aug. 26, 1986

[54] GREASE EXTRACTOR

[75] Inventors: Toshihiro Higashino; Hirofumi Mitsunaga; Takahiro Nakanishi, all of Osaka; Yoshihiro Taya, Sakai, all of Japan

[73] Assignee: Kuraco Limited, Osaka, Japan

[21] Appl. No.: 636,476

[22] Filed: Jul. 31, 1984

[30] Foreign Application Priority Data

Aug. 4, 1983 [JP] Japan .................... 58-143522

[51] Int. Cl.⁴ .............................................. F24C 15/20
[52] U.S. Cl. ................................ 126/299 E; 55/238;
55/456; 55/465; 126/299 D
[58] Field of Search ............... 55/238, 462, 456, 465,
55/DIG. 36; 126/299 D, 299 E, 299 F

[56] References Cited

U.S. PATENT DOCUMENTS

| 735,192 | 8/1903 | Allert | 55/466 |
|---|---|---|---|
| 3,030,755 | 4/1962 | Farr et al. | 55/456 |
| 3,393,497 | 7/1968 | Donnelly | 126/299 D X |
| 4,038,056 | 7/1977 | Diachuk et al. | 126/299 E X |
| 4,071,019 | 1/1978 | King | 55/238 X |
| 4,098,582 | 7/1978 | Takeda | 55/456 X |
| 4,103,676 | 8/1978 | Kastner | 126/299 E |
| 4,460,386 | 7/1984 | Diachuk | 126/299 E X |

FOREIGN PATENT DOCUMENTS 917822 1/1947 France .................... 55/456
142152 6/1980 German Democratic Rep. ... 55/238

Primary Examiner—Harold Joyce
Attorney, Agent, or Firm—Armstrong, Nikaido, Marmelstein & Kubovcik

[57] ABSTRACT

A grease extractor incorporating a plurality of oblique baffles disposed within a barrel in angularly displaced relation with a longitudinal axis of the barrel. The oblique baffles intercross with each other at the longitudinal axis and are arranged in spaced and angularly displaced relation with each other so as to define within the confines of the barrel a plurality of congruent flow paths extending generally spirally about said longitudinal axis. When the grease-laden fumes are drawn into the grease extractor, they are forced to follow said flow paths as whirling about the longitudinal axis to move at ever-changing velocities, whereby the grease particles entrained in the fumes are subject to centrifugal action during the substantially entire course of flow to impinge continuously on the oblique baffles and the inner surface of the barrel to be deposited thereon. Accordingly, substantially the entire length of the flow paths can define the grease trapping surfaces therealong, increasing the grease extraction efficiency. In addition to the above, the disposition of the plural flow paths about the longitudinal axis can provide a compact arrangement of the extractor which enables maximum extraction efficiency at a minimum dimensional requirement.

7 Claims, 20 Drawing Figures

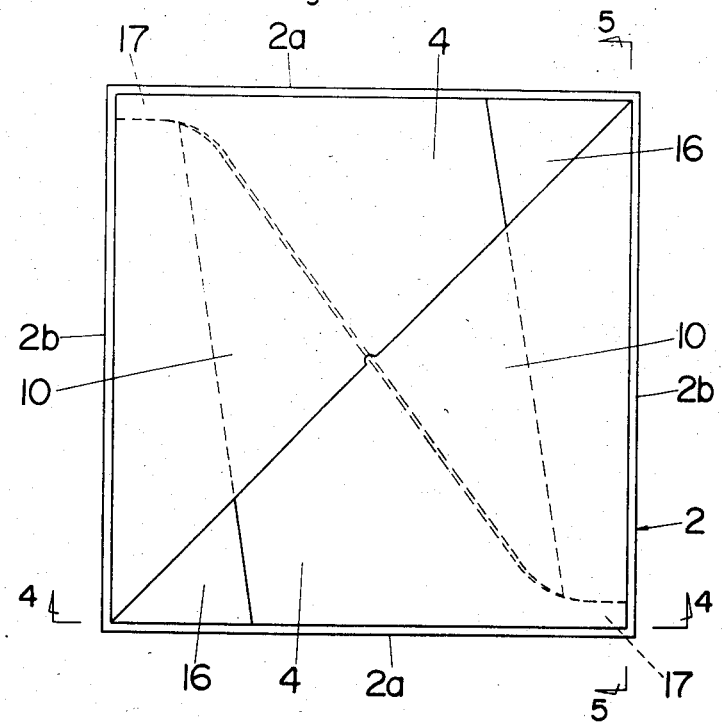
Fig. 3
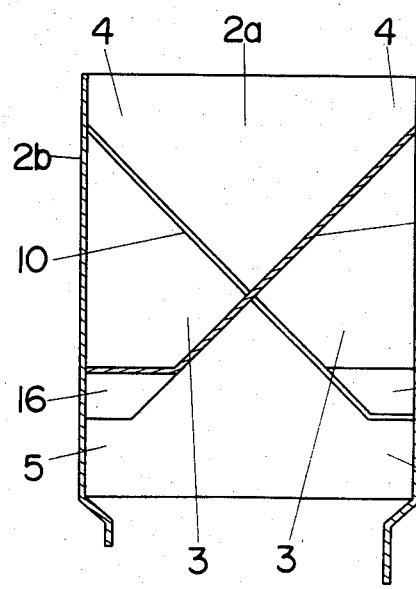
Fig. 4
Fig. 5

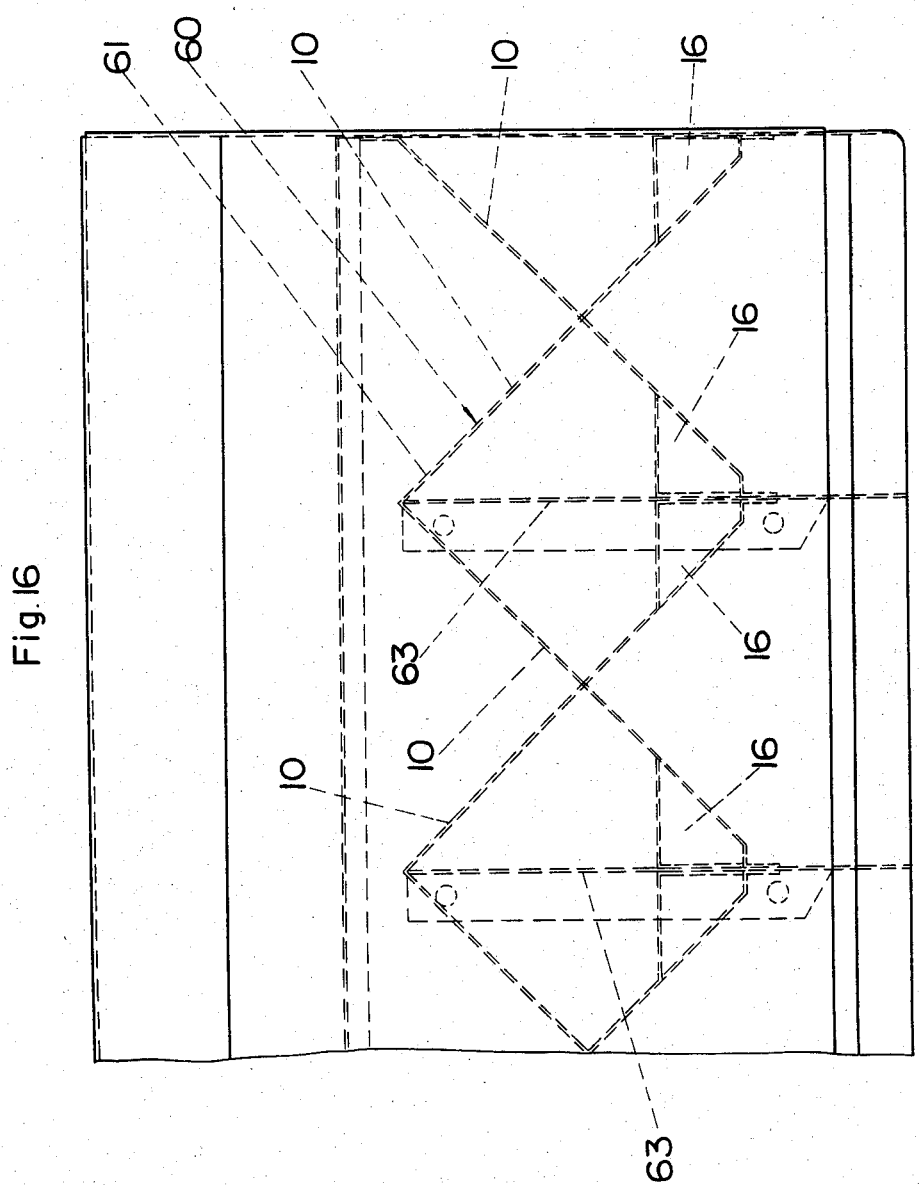

GREASE EXTRACTOR

DESCRIPTION OF THE PRIOR ART

1. Fields of the Invention

The present invention relates generally to a grease extractor, and more particularly to an improved grease extractor for removing grease and oil vapors from a hot vaporous exhaust stream in a kitchen ventilating equipment.

2. Description of the Prior Art

There have been proposed a variety of grease extractors which remove the grease or oil particles from the exhaust fumes in the kitchen. Among the prior grease extractors, an extractor designed to rely on the centrifugal effect for removing the grease or oil particles has been widely accepted and replaced the mesh-type extractors by its improved grease extraction efficiency. Such prior extractor making use of the centrifugal action, for example, as disclosed in U.S. Pat. Nos. 3,870,494 to Doane and 3,566,585 to M. A. Voloshen et al, is provided with baffles which define tortuous flow paths effecting the centrifugal action whereby the grease particles are flung outwardly to be removed from the fumes and deposited on the collecting surfaces. However, the above flow paths are such that the fumes introduced travel a tortuous or zig-zag course substantially only within the same plane, limiting the centrifugal effect in that plane and therefore preventing the above extractor from having a higher grease extraction efficiency. To overcome this problem, there has been proposed an improved grease extractor as disclosed in U.S. Pat. No. 3,890,124 to Howes, which includes vortex generators in the form of a substantially cylindrically shaped open ended baffle for causing the drawn fumes to assume a whirling motion in a substantially spiral path as the fumes flow along the curved inside surface thereof. However, the above cylindrically shaped vortex generator is not always expected to give the whirling motion to all the fumes introduced through the mouth extending the entire length thereof in addition to that it requires a considerable length of the generator for effecting such whirling motion. In fact, the portions of the incoming fumes will pass through the vortex generator to be directed to the exits at the longitudinal ends thereof without being subject to the whirling motion and this is more likely to occur as the length of the generator is reduced. Accordingly, the above grease extractor is not expected to be made compact particularly with respect to the length while retaining a higher extraction efficiency. Further, the cross section of the vortex generator can see only one flow of the fumes toward one of the exits at the longitudinal ends, although it has a relatively larger inside space, which further militates against the compact arrangement of the grease extractor. In view of the above, it is most desired that a grease extractor having compulsive means for giving the whirling motion with respect to all the income fumes within a compact structure in order to attain a further increased extraction efficiency as well as to reduce the amount of the material to be employed and therefore reduce the manufacturing cost.

SUMMARY OF THE INVENTION

The above drawbacks have been eliminated by the present invention which provides a uniquely designed grease extractor having the compulsive means for giving the whirling movement to all the income fumes from the kitchen in a compact structure. The grease extractor in accordance with the present invention comprises a barrel with a longitudinal axis and a plurality of oblique baffles disposed in the barrel in angularly displaced relation with the longitudinal axis. Said oblique baffles intercross with each other at the longitudinal axis and are arranged in spaced and angularly displaced relation with each other so as to define within the confines of the barrel a plurality of congruent flow paths extending generally spirally about said longitudinal axis. Said flow paths have respective inlets at the upper end of the barrel which are angularly spaced about the longitudinal axis and have respective outlets at the lower end of the barrel which are angularly spaced about the longitudinal axis. When the grease-laden fumes in the kitchen are forcibly drawn into the grease extractor by a suitable exhaust fan, the fumes are compelled to be subject to ever-changing velocities as they pass through the respective flow paths so as to undergo whirling motions which develop the centrifugal action during the whole flow paths, whereby the grease or oil particles in the fumes are caused to removed from the fumes and impinged and deposited on the baffles and the inner surfaces of the barrel. With this arrangement, the oblique baffles cooperative with the barrel to define the substantially spiral flow paths for compulsively directing the fumes to move at ever-changing velocities. In addition, a plurality of congruent flow paths are formed within the barrel. The grease particles separated from the fumes are increased within a limited inside space of the barrel so as to result in increased grease extraction efficiency.

Accordingly, it is a primary object of the present invention to provide a grease extractor which gives rise to increased grease extraction efficiency with a compact structure.

In a preferred embodiment of the present invention, the barrel is shaped to have a square cross section so that the outer perimeters of the respective flow paths include inside corner portions of the barrel at which the radius of each flow paths are abruptly changed. This will induce the corresponding abrupt change in the flowing direction of the fumes as well as turbulence within the flow paths, whereby additional deposition of the grease particles can be made on the inside corner surfaces and at the same time coagulation of the minute grease particles suspended in the fumes is promoted. The flow paths are formed with a corresponding number of oblique baffles plus one barrel and require no other members. Thus the grease extractor can be easily and economically assembled with a minimum number of parts.

It is therefore another object of the present invention to provide a highly efficient grease extractor which is simplest in its construction and can be manufactured at a lowest cost.

In addition to the above, the square configuration of the barrel is advantageous in that a plurality of the grease extractors can be arranged in side-by-side relationship for covering the entire width of a ventilating course leading from the cooking surface to an exhaust duct.

Another advantageous feature of the above embodiment resides in the employment of troughs integrally formed at the lower portion of the respective oblique baffles for collecting the extracted and liquefied grease. The troughs slope downwardly and the lower end of each trough is spaced from the corresponding inner surface of the barrel to define therebetween a drain opening.

It is therefore a further object of the present invention to provide a grease extractor which requires no additional parts for collecting and draining the grease deposited, retaining a simplest construction feature.

The grease extractors are arranged in a row to form an extractor assembly in which the grease extractors are aligned in side-by-side relation for covering the entire width of the ventilating course. The baffles of the extractors act to such an extent to resist against the incoming flow of the fumes to reduce the velocity of the fumes and diffuse the incoming fumes substantially uniformly along all the extractors. Thus, all the extractors can participate at substantially equal efficiency to remove the grease particles from the incoming fumes, whereby increasing the total amounts of the grease particles to be removed from the fumes passing through the entire assembly. A deflector member is preferably cooperative with the above extractor assembly to angularly extend over the upper surfaces of all the grease extractors from one upper end of the assembly. Such deflector member serves to direct the flow direction of the fumes flowing horizontally so as to direct the fumes downwardly through the respective grease extractors and has the additional effect of reducing and diffusing the incoming flow of the fumes as well as of collecting the grease particles on its surface prior to the fumes drawn into the grease extractors.

Additional feature of the present invention resides in the employment of the washing spray means in the vicinity of the barrel, whereby the grease captured on the inner surfaces of the barrel and on the surfaces of the oblique baffles can be cleaned up from time to time.

Other objects and advantages of the present invention will be readily understood from the detailed description thereon taken with the accompanying drawings.

BRIEF DESCRIPTION OF THE DRAWINGS

In the drawings,

FIG. 3 is a top plan view of the above grease extractor;

FIG. 4 is a cross section taken along line 4—4 of FIG. 3;

FIG. 5 is a cross section taken along line 5—5 of FIG. 3;

FIG. 16 is a front view of the above grease extractor assembly;

DESCRIPTION OF THE PREFERRED EMBODIMENTS

Figure 1:
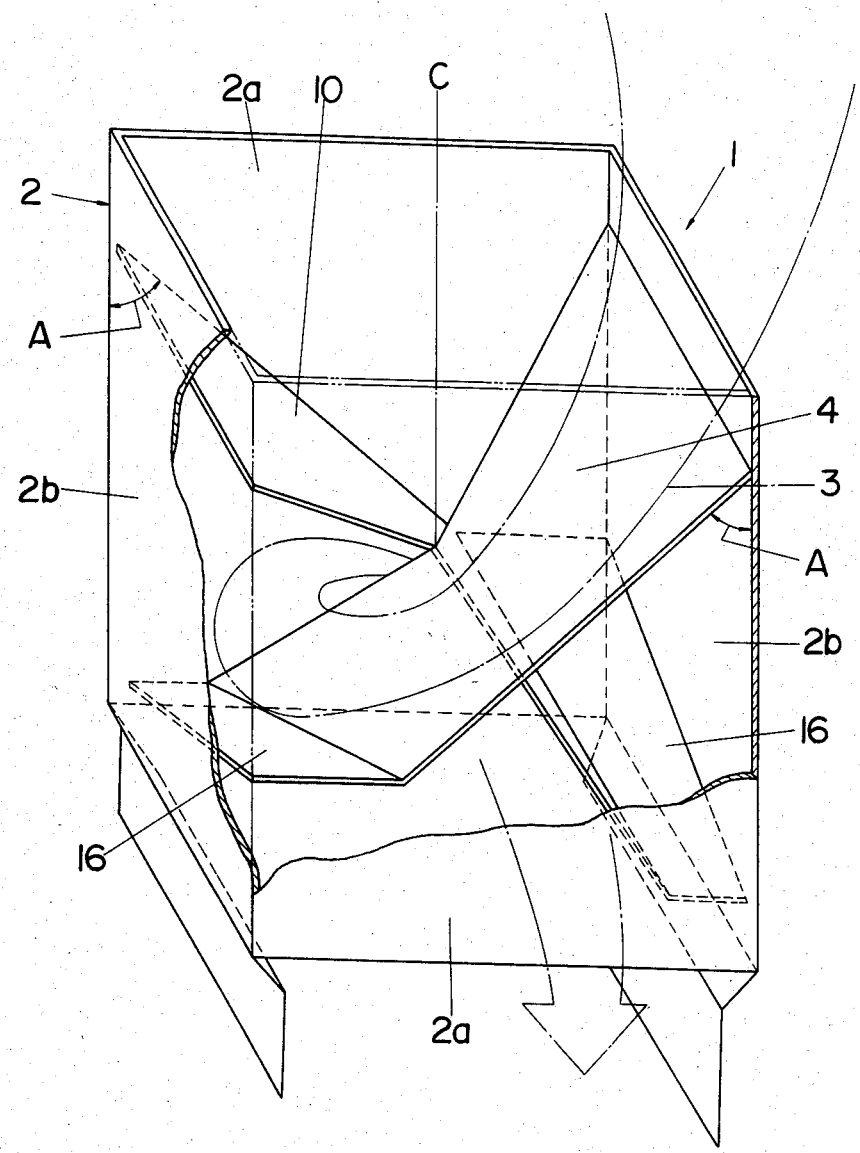
FIG. 1 is a perspective view partially cut away of a grease extractor in accordance with one embodiment of the present invention.
Figure 2:
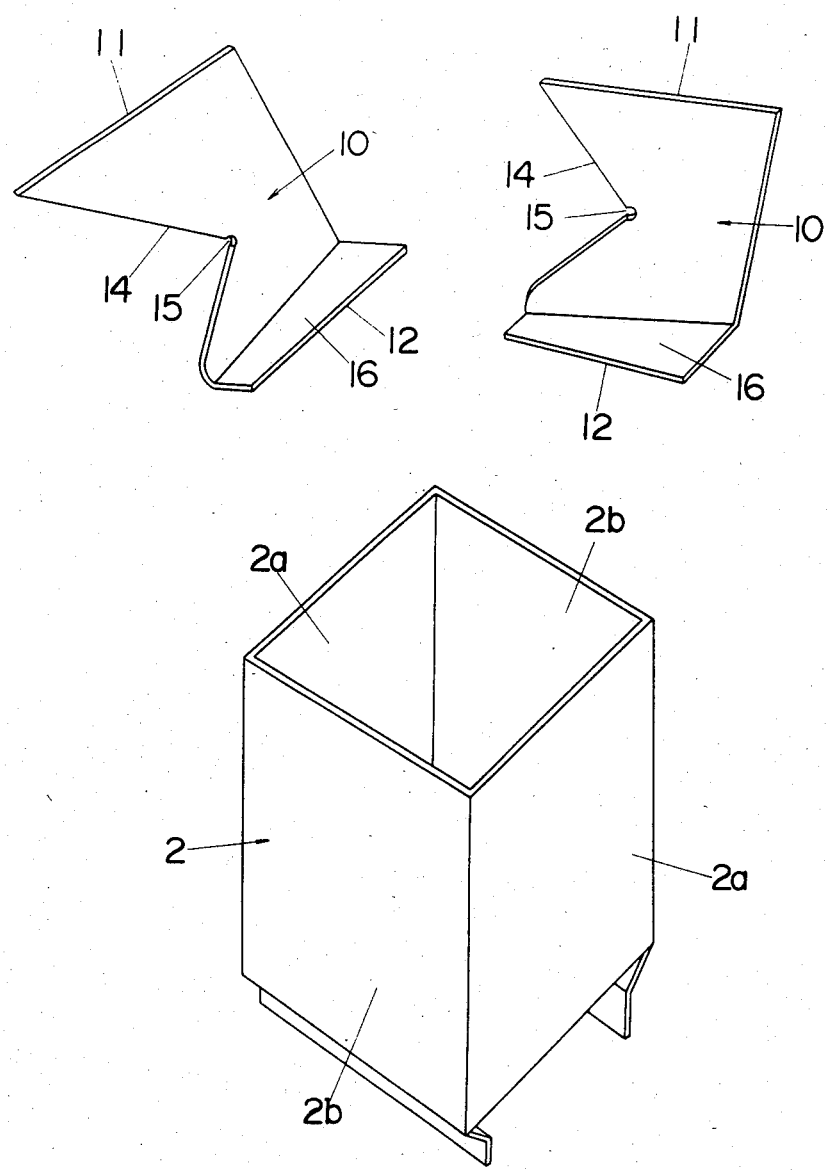
FIG. 2 is an exploded view of the above grease extractor.

Referring now to FIGS. 1 through 5, there is illustrated a grease extractor 1 in accordance with a preferred embodiment of the present invention. The grease extractor 1 comprises a barrel 2 having opposed side walls 2a and opposed end walls 2b to have a uniform square cross section along its length. A pair of oblique baffles 10 are incorporated within the barrel 2 in such an angle as indicated at <A> in FIG. 1 with respect to the end walls 2b of the barrel 2 to form two spiral flow paths 3 therebetween in cooperation with the inner surfaces of the barrel 2.

Each oblique baffle 10 is a substantially flat plate with upper and lower straight edges 11 and 12, a straight side edge 13 and a notched side edge 14. The upper and lower edges 11 and 12 of each baffle 10 are in intimate engagement with the inner surfaces of the respective opposed end walls 2b. The straight side edge 13 of each baffle 10 is in intimate engagement with the inner surface of each of the opposed side walls 2a. The intimate engagement performed by welding or the like is required for preventing the fumes from leaking through the connecting portions between the baffles 10 and the barrel 2. The apex of the notched side edge 14 of one oblique baffle 10 is crossed with that of the other oblique baffle 10 at a longitudinal axis <C> of the barrel 2 in such a manner that the baffles 10 are angularly displaced with one another and that the upper half of one oblique baffle 10 overlies but spaced from the lower half of the other oblique baffle 10 to provide within the confines of the barrel 2 a pair of congruent flow paths 3 extending downwardly and spirally about the longitudinal axis <C>.

Each said oblique baffle 10 is provided at its apex with a locking eye 15 the diameter of which is as large as or a little larger than the thickness of the oblique baffle 10. When the oblique baffles 10 are combined together, both the locking eyes 15 of the oblique baffles 10 are engaged with each other for locking the baffles 10 in a predetermined angular relationship.

Said flow paths 3 have at the upper end of the barrel 2 respective inlets 4 formed respectively between the upper portion of the notched side edge 14 of one baffle 10 and the upper surface of the other baffle 10, which are angularly spaced about the longitudinal axis and have at the lower end of the barrel 2 respective outlets 5 formed respectively between the lower portion of the notched side edge 14 of one baffle 10 and the lower surface of the other baffle 10, which are likewise angularly spaced about the longitudinal axis <C>.

The oblique baffles 10 are provided, respectively, at their lower portions with troughs 16 which slope downwardly along the inner surfaces of the corresponding end walls 2b. As shown in FIG. 4, the trough 16 is formed by bending lower marginal area of said substantially flat plate composing the oblique baffle 10 and is made generally perpendicular to the end wall 2b of the square-shaped barrel 2 on which said lower straight edge 12 is positioned. As shown in FIG. 5, the upper end of each trough 16 is continuous with one of the side walls 2a and the lower end of each trough 16 is spaced from the other side wall 2a to define therebetween a drain opening 17. The extracted grease flows down along the trough 16 and then drops off through said drain openings 17. The trough 16 may be formed in an arbitrary position between the lower straight edge 12 and the locking eye 15, though an optimum grease extraction efficiency has been attained in the oblique baffle 10 shown in the above figures.

The mechanism how the grease is extracted from grease-laden fumes will be explained in detail hereinafter. First of all, a few preliminary premises concerning the behaviors of the grease-laden fumes are now being discussed for easy understanding of a superior grease extraction mechanism accomplished by the present invention.

The grease-laden fumes can be regarded as a kind of aerosol which is a dispersion system the dispersion medium of which is gas and the dispersoid or aerosol particles of which is liquid grease particles. The diameters of aerosol or grease particles seen in the grease-laden fumes arising from cooking processes are found to be distributed over a wider range of 0.01 to 10 microns. It is also known that relatively large aerosol particles having diameters of above 1 micron are subject to the regular aerodynamic movement and is therefore susceptible to acceleration forces such as by centrifugal force applied thereto so that they are relatively easily removed from the air by the application of such forces. On the other hand minute aerosol particles having diameters of below 1 micron are subject to random movement called Brownian movement which is rather independent of the above acceleration and are therefore hardly to be removed from the air or fumes only by the application of such forces.

Said large particles normally flow along the stream line. But, when the flowing direction is abruptly changed by obstacles such as baffle members, those particles cannot follow the directional change so that some of the particles will impinge upon the obstacles to be deposited thereon. Said large particles are also subject to the acceleration applied thereto. For example, the suspending particles in the air stream moving circularly with an angular velocity are driven toward the radially outer direction under the effect of the centrifugal force so as to be removed from the air.

The minute particles, on the contrary, are not susceptible to an external force and is liable to follow the flowing direction of the air without being diverted therefrom irrespective of the external force acting thereon. Thus the deposition of such minute particles on the obstructing surfaces rarely occurs. However, the minute particles will coagulate by collision with each other under the Brownian movement to be translated into larger particles enough to be easily removed from the air stream. Accordingly, it is most desirable for removing the minute particles from the air to increase the number of collision of the minute particles. In view of the behavior of the minute or aerosol particles undergoing the Brownian movement the minute particles will have a greater chance to collide with the other minute particles when they have increased chances of colliding with air molecules. From this, it is found that the collision of the minute particles is enhanced where the air undergoes a turbulent flow in which air molecules have greater chances of colliding with the minute particles and that the turbulent flow of the air carrying the minute particles is most desired for removing such particles from the air or fumes.

In the present invention, when the grease-laden fumes are drawn into the barrel 2 by forced ventilation, the fumes are rotated spirally at ever-changing velocities while passing through the flow paths 3 so that the larger grease particles entrained in the fumes are continuously subject to ever-changing direction of flow or centrifugal forces, whereby they are removed from the fumes to be deposited on the inner surfaces of the barrel 2 and the oblique baffles 10. In addition to the above, the fumes flowing spirally along the flow paths 3 encounter the inside corner portions of the barrel 2 at which the radius of spiral motion is abruptly changed, so that they can assume a turbulent flow at such corner portions. It is this turbulent flow that is responsible for promoting the coagulation of the minute particles, as described above, for successfully removing the minute particles from the air as translating the same into the larger particles to be easily deposited by the successive centrifugal effects. Accordingly, both the larger and minute grease particles can be well removed from the fumes, providing increased grease extraction efficiency.

Figure 6:
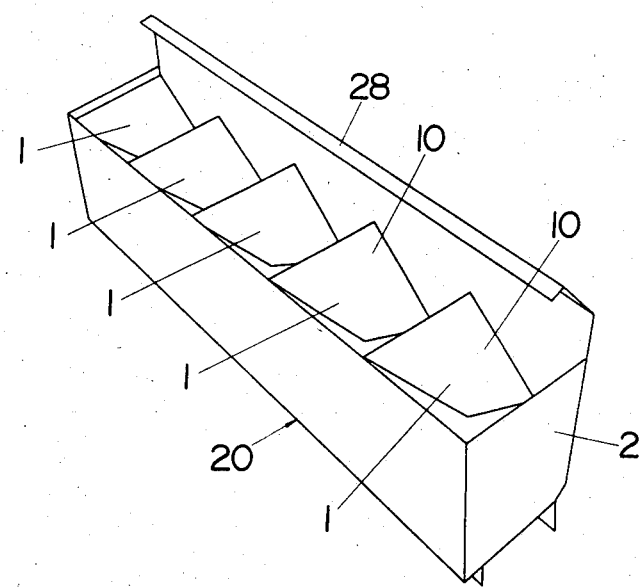
FIG. 6 is a perspective view of a grease extractor assembly in which a plurality of grease extractors having substantially the same construction as the above extractors are arranged in a row.

FIG. 6 shows one typical application of the above grease extractor 1, in which a plurality of grease extractors having substantially the same construction as the above are arranged in a row to form a grease extractor assembly 20 which is to be installed within a ventilating duct 21 of a kitchen ventilating equipment 22. This assembly 20 is equivalent in its function as that in which a plurality of the above extractors 1 are arranged in side-by-side relation in a row but differs therefrom in that it has common side walls to the adjacent barrels 2, the detailed construction feature will be discussed later with reference to FIGS. 12 to 16.

Figure 7:
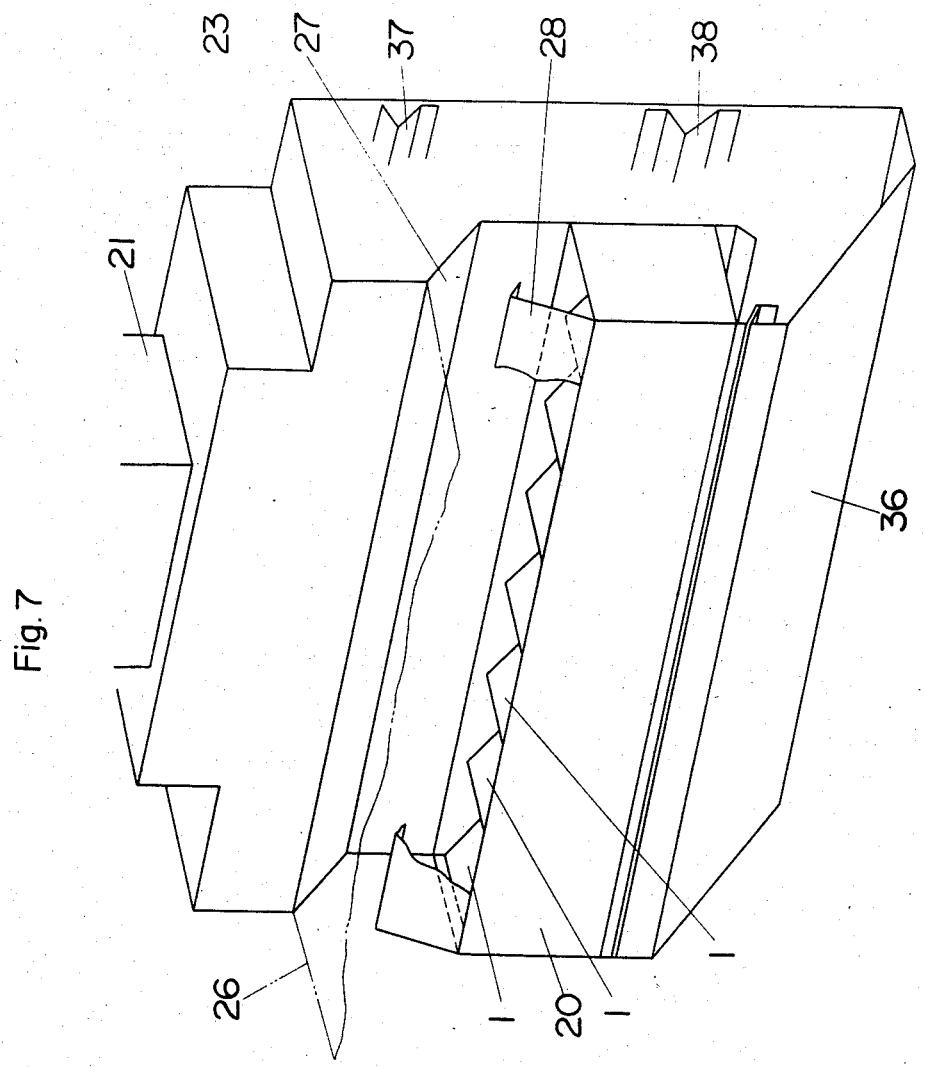
FIG. 7 is a perspective view partially cut away of a kitchen ventilating equipment incorporating the above grease extractor assembly.
Figure 8:
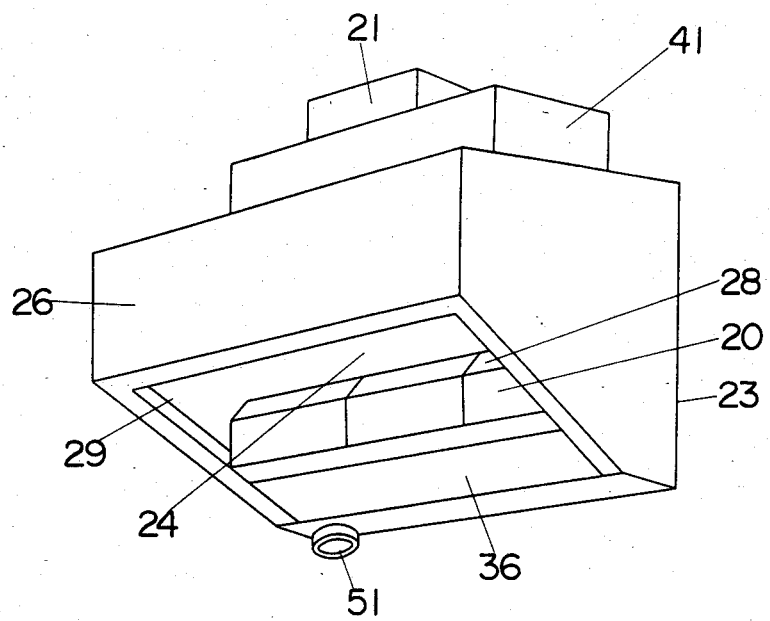
FIG. 8 is another perspective view of the above kitchen ventilating equipment.

FIG. 7 shows where the above grease extractor assembly 20 is installed in a kitchen ventilating equipment 22; and FIG. 8 shows general appearance of the above kitchen ventilating equipment 22. As shown in the figures, the kitchen ventilating equipment 22 comprises a housing 23 with a front opening 24 and an exhaust duct 25. A hood 26 extends forwardly of the front opening 24 from the housing 23 to project at least partially over a cooking surface to capture the vapors and fumes emitted therefrom through an inclined mouth formed at the lower end of the hood 26. The grease extractor assembly 20 is located within the housing 23 with its upper end position below the front opening 24. A deflector member 27 extends upwardly and forwardly from the rear and upper end of said grease extractor assembly 20 and terminates at the upper end of said front opening 24. An entrance baffle 28 extends in the opposite direction to the deflector member 27 from the lower edge of said front opening 24 but terminates in a position spaced forwardly from the deflector member 27 to define therebetween passage leading to the inlets 4 of the individual grease extractors 1 in said assembly 20.

Figure 9:
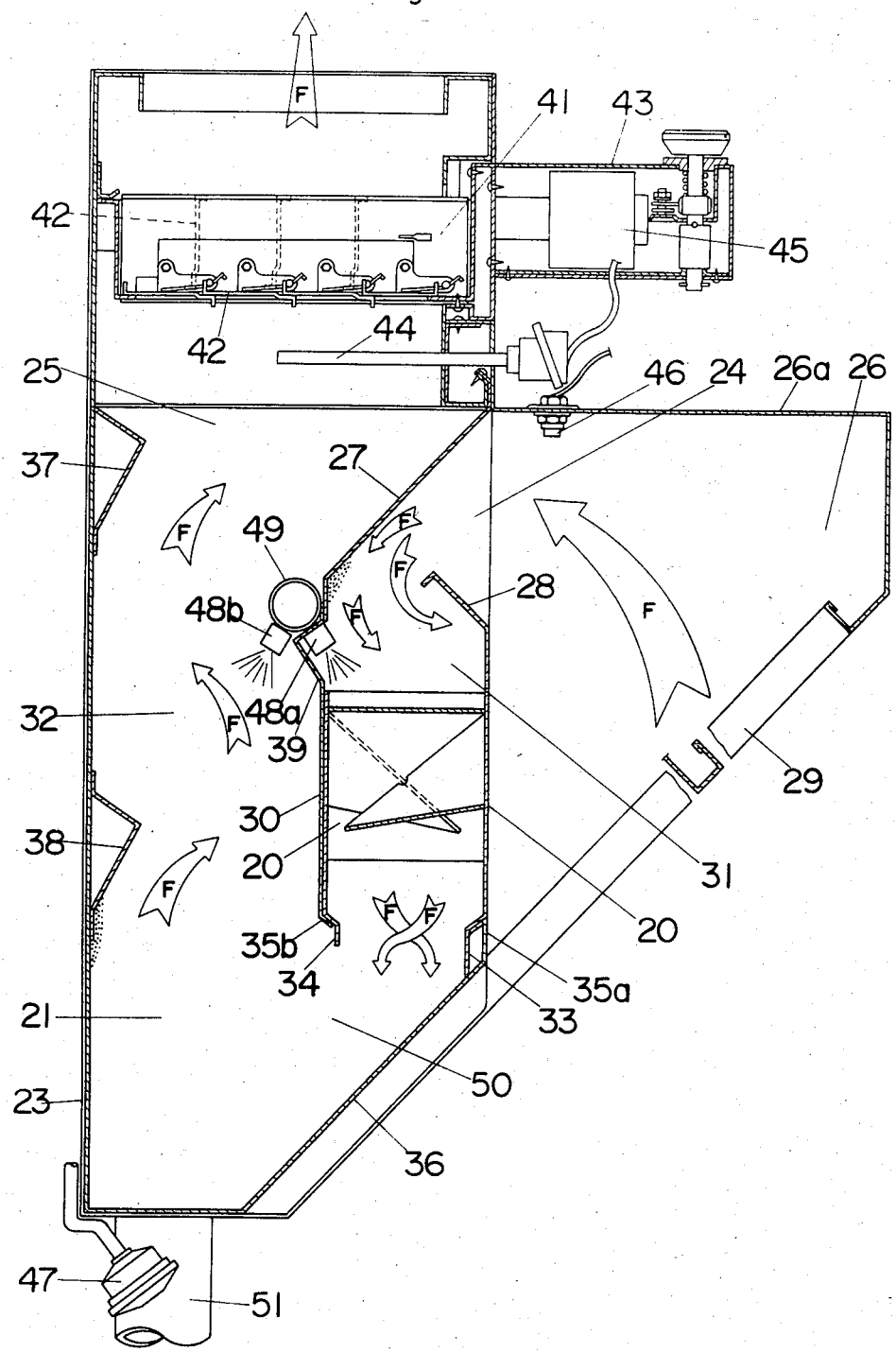
FIG. 9 is a vertical sectional view of the above kitchen ventilating equipment.

FIG. 9 shows the vertical sectional view of the kitchen ventilating equipment 22. As shown in the figure, a middle board 30 is vertically installed in slightly recessed position from the front opening 24 to form within the housing 23 a U-shaped ventilating duct 21 comprising a downward flow course 31 leading from said front opening 24 and an upward flow course 32 leading from the lower end of said downward flow course 31 and terminating in said exhaust duct 25. The grease extractor assembly 20 extends over the entire width of the downward flow course 31, said grease extractors 1 having their inlets 4 facing upwardly and outlets 5 facing downwardly. Forced air generating means such as an exhaust fan (not shown) is provided on the side of the exhaust duct 25 for drawing grease-laden fumes into said ventilating duct 21 through the front opening 24.

Integrally formed at the bottom of the grease extractor assembly 20 are a pair of engaging plates 33, 34 which engage complementary flanges 35a and 35b provided on the middle board 30 and the housing 23 for fixing the grease extractor assembly 20 in place. The engaging plates 33, 34 additionally serve to provide a somewhat constricted passage at the downstream of the assembly 20 between the assembly 20 and an inclined bottom 36 of the housing 23.

When the exhaust fan (not shown) operates, the grease-laden fumes are forcedly drawn into the hood 26 through the mouth 29. The introduced grease-laden fumes (shown at <F> in FIG. 9) are then turned by the combination of the entrance baffle 28 and the deflector member 27. By that direction turn of the grease-laden fumes, coarse particles and small dust are eliminated, as they impinge upon the deflector member 27 by the centrifugal effect applied thereto due to the abrupt change of flowing direction.

Figure 10:
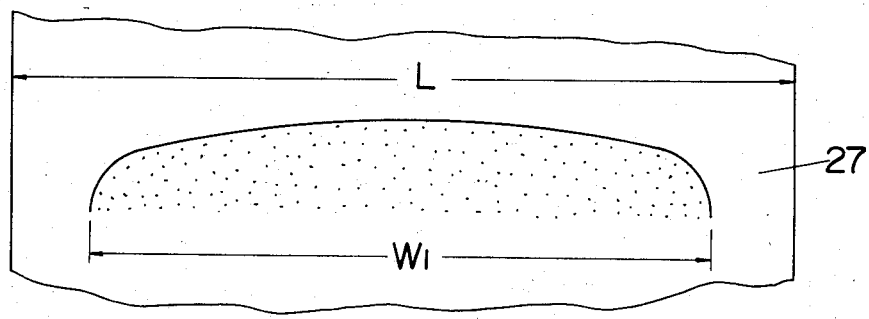
FIG. 10 is an explanatory view illustrating the enlarged area over which a deflector member of the kitchen ventilating equipment captures grease.

In addition, in this embodiment, the grease extractor assembly 20 is positioned right under the deflector member 27 and the entrance baffle 28. Therefore, the grease extractor assembly 20 functions as a kind of obstacle, which causes the incoming fumes to spread laterally along the width of the assembly 20 with an attendant velocity reduction, whereby the grease-laden fumes become diffused over as long as the full width <L> of the assembly 20. In fact, as shown in FIG. 10, the coarse particles and small dust are deposited on a widened area W₁ of the deflector member 27.

The grease-laden fumes, after having passed through the assembly 20 to be removed of most of the suspended grease particles, then flow toward the inclined bottom 36 of the housing and collide as rotating rather spirally to be turned upwardly, at which the complicated directional change of the fumes occur to give a turbulent flow. Thus, the grease particles of minute diameters still suspended in the outflow of the assembly are further subject to the turbulent flow whereby the coagulation of the minute grease particles are prompted so as to be easily impinged and deposited on said inclined bottom 36 and on the surfaces in the subsequent flow course or the upward flow course 32 by the centrifugal effect.

Further, deflector angles 37, 38, and 39 having generally L-shaped section are attached to the front side of a back board 40 and to the rear side of the middle board 30 in such a manner that they are staggered on opposite faces of the upward flow course 32. These combination of the deflector angles 37, 38, and 39 serve to define a tortuous path along the upward flow course in which the fumes are subject to directional change of flow at the respective deflectors, such that the grease particles yet suspended in the upwardly flowing fumes are removed by the centrifugal effect and deposited mainly on the lower sides of the deflector angles 37, 38, and 39.

Due to the cooperated operation of the several mechanisms for grease extraction described above, the present system has successfully attained a maximum grease removal rate of 94.5% with an averaged rate of 93.5%, while it has been difficult for the conventional equipment to remove more than 80% of the grease produced in a kitchen room.

The exhaust fumes removed of grease are ejected out of the housing 23 through a fire-proof damper device 41 installed at the top of the housing 23. A plurality of shutter plates 42 are incorporated in the fire-proof damper device 41. An automatic shutdown device 43 is installed outside the fire-proof damper device 41. A heat detector 44 including a thermistor or a thermocouple etc. is located slightly below the shutter plate 42. The heat detector 44 detects the temperature inside the housing 23. When an abnormal temperature higher than a predetermined value is detected, the electromagnetic device 45 is energized to close the shutter plates 42 for prevention of the spreading of fires. Further, another heat detector 46 such as a thermistor is attached on the top board 26a of the hood 26 with its detecting front exposed in the hood 26. When the heat detector 46 detects an abnormally high temperature, the shutter plates 42 are closed and at the same time fire extinguishing liquid is ejected from a fire fighting nozzle 47 to the cooking appliances below.

Washing nozzles 48 are for ejecting washing liquid such as hot water including detergents. The washing liquid is supplied to the washing nozzles 48 through a pipe 49. The washing nozzle 48a ejects the washing liquid into the grease extractor assembly 20; the washing nozzle 48b ejects the washing liquid into the cavity 50 of the housing 23. Each washing nozzle 48 operates either automatically by a suitable timer or manually for the purpose of actuating the washing nozzle 48 at every beginning and/or end of a daily cooking. By that washing, the inside of the kitchen ventilating equipment 22 can be always kept clean. The above washing nozzles 48 may be so arranged to eject the liquid when the inside temperature increases abnormally, rendering the system more effective for prevention of fire spreadings. The soiled water after said washing is drained out of the housing 23 through the drain 51 at the bottom of the housing 23.

Figure 11:
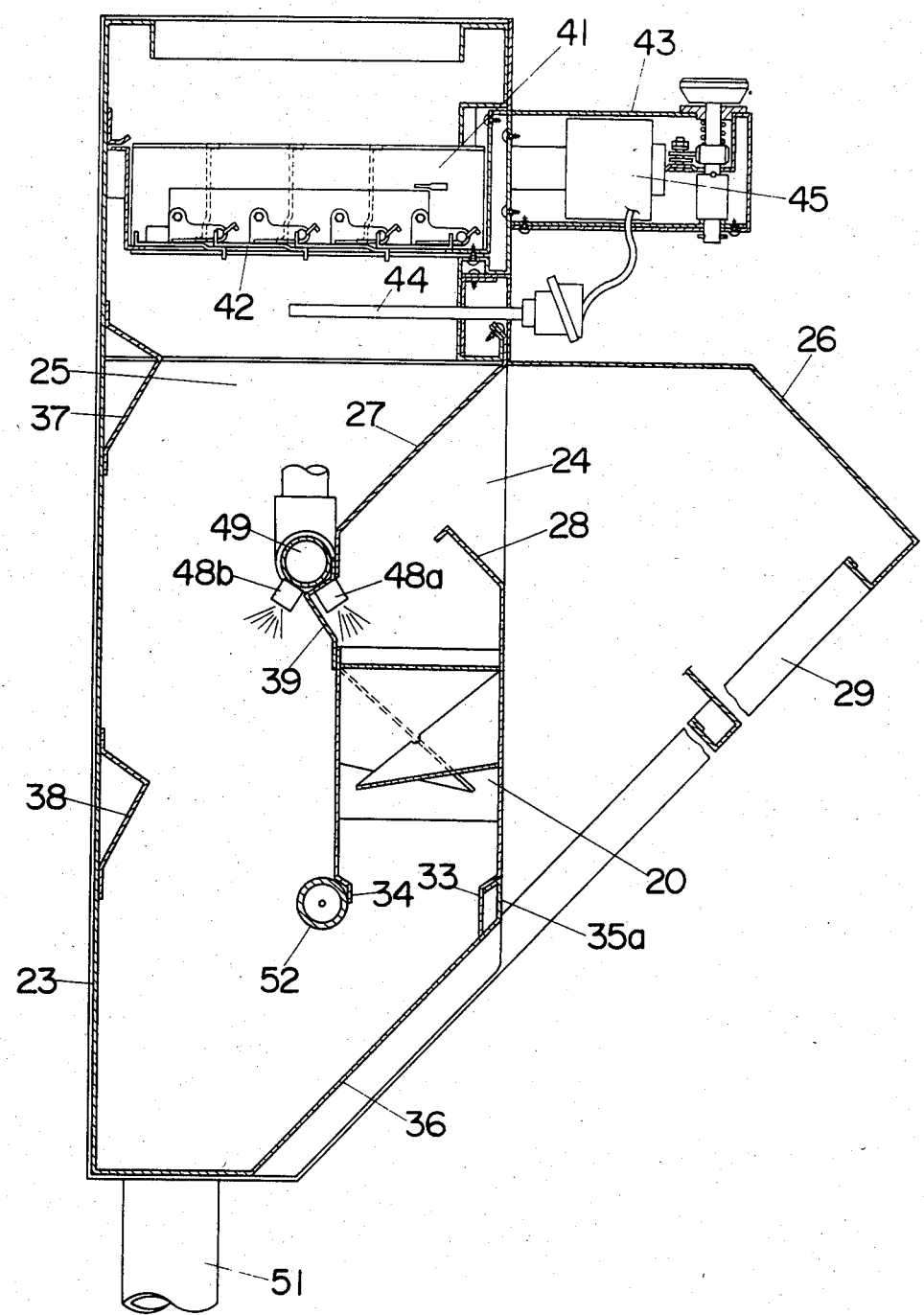
FIG. 11 is a vertical sectional view of one modification of the above kitchen ventilating equipment.
Figure 12:
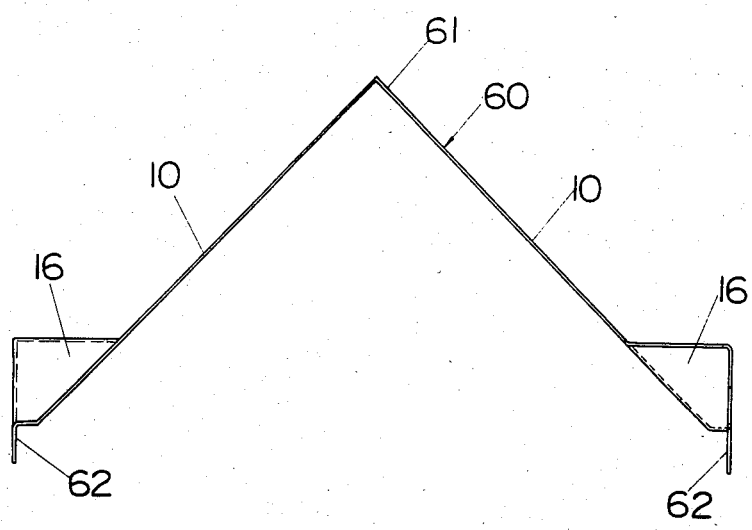
FIG. 12 is a front view of an L-shaped plate employed in the above grease extractor assembly for defining by its both halves two oblique baffle plates extending over the adjacent grease extractors.
Figure 13:
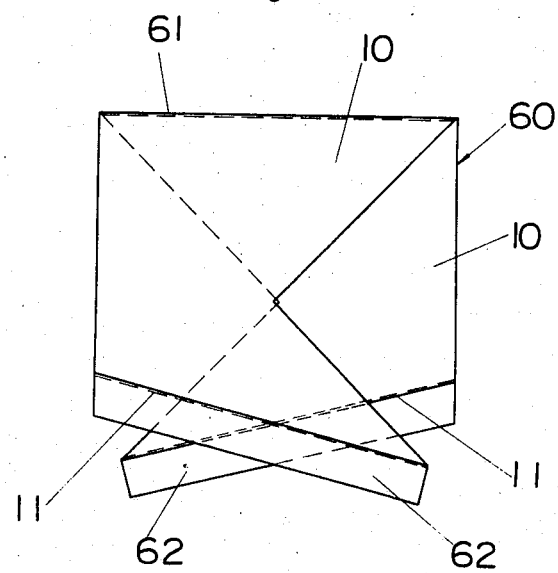
FIG. 13 is a side view of the above L-shaped plate.

FIG. 11 shows one modification of the above kitchen ventilating equipment 22 shown in FIGS. 6 through 10. In this modification, the rear wall of the assembly 20 constitute the middle board 30 of FIG. 9. The engaging plates 33 and 34 at the lower end of the grease extractor assembly 20 are arranged to be supported on a laterally extending lower fixed pipe 52 and the flange 35b at front lower end of the housing 23. The upper side of the back wall of the grease extractor assembly 20 is supported by a laterally extending upper fixed pipe 49 through the deflector angle 39. With this arrangement the inside of the housing 23 is largely opened for easy cleaning and inspection of the housing 23 when the assembly 20 is removed from the housing 23.

Figure 14:
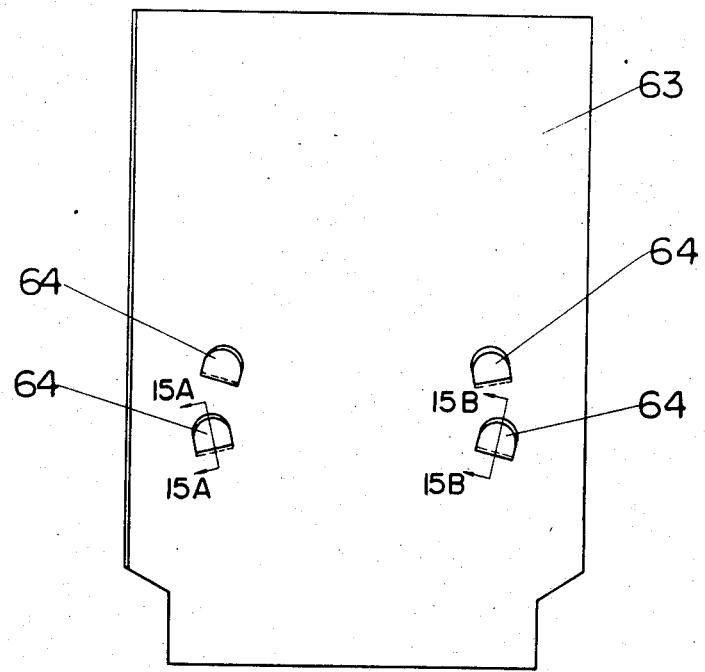
FIG. 14 is a front view of one of partitions employed in the above grease extractor assembly for dividing the assembly into a corresponding number of the grease extractors.
Figure 15A:
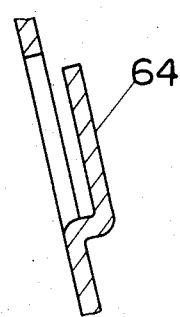
FIGS. 15A and 15B are sectional views taken respectively on lines 15A—15A and 15B—15B of FIG. 14.
Figure 15B:
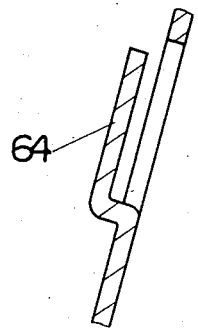

Referring to FIGS. 12 to 15, there are shown members of said grease extractor assembly 20 which includes an elongated rectangular frame divided by partitions 63 into a corresponding number of square shaped barrels 2 each being equivalent to the barrel of FIG. 1 and generally L-shaped plate members 60 which define said oblique baffles 10 in the adjacently disposed barrels 2, all the members of which being made of stainless steel. As, shown in FIGS. 12 and 13, each of the generally L-shaped plates 60 has its either half designed in the same configuration as that of one oblique baffle 10 in the barrel 2 so that it defines one oblique baffle 10 in each of the two adjacent barrels 2. That is, the plate member 60 consists of two oblique baffles 10 having the integral trough 16 and combined at the upper straight edge 11 at a right angle and extending downwardly therefrom. Both said oblique baffles 10 composing one L-shaped plate 60 are provided at the lower straight edges 11 thereof with downwardly extending legs 62. FIG. 14 shows one of the partitions 63 each of which is provided on both surfaces thereof with a pair of lugs 64 to receive said downwardly elongated legs 62 of the oblique baffles 10. The lugs 64 are struck from the partition 63 to be formed integrally therewith as shown in FIGS. 15A and 15B. The upper edge 61 of each L-shaped plate 60 rests and is supported on the upper end of the corresponding partition 63 in such a manner, as illustrated in FIG. 16, that each of the barrels 2 except those located at both ends has a pair of oblique baffles 10 which extend from different L-shaped plates 60 and are arranged in the same relationship as in the barrel 2 of FIG. 1. Added to each of the barrels 2 at both ends of the assembly 20 is a single baffle plate of the same configuration as the other baffle 10 which is cooperative with one of the baffles 10 of the L-shaped plate 60 to complete the baffling construction. The sealing between the oblique baffle 10 and the inner surface of the barrel 2 is performed by spot welding therebetween, though silicon resin is employed to ensure the sealing, if necessary.

Figure 17:
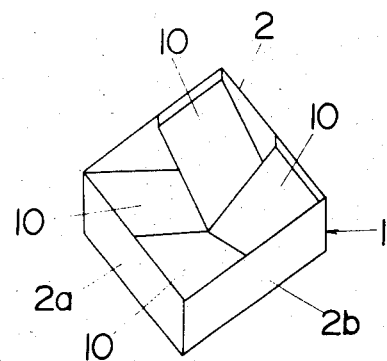
FIG. 17 is a perspective view in schematic representation of a grease extractor in accordance with a second embodiment of the present invention.
Figure 18:
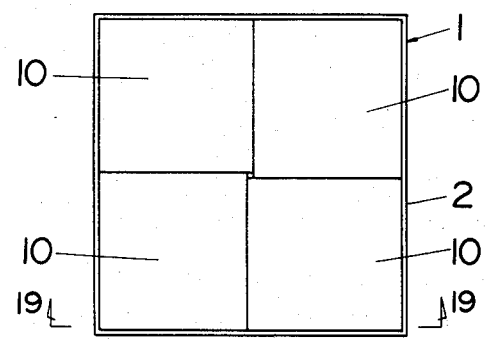
FIG. 18 is a top plan view of the above grease extractor.
Figure 19:
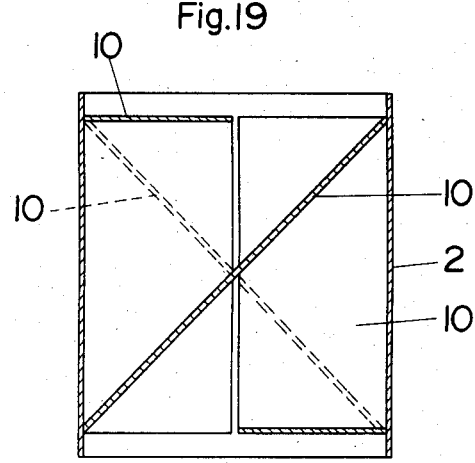
FIG. 19 is a cross section taken along line 19—19 of FIG. 18.

The second embodiment of the present invention shown in FIGS. 17 through 19 is substantially similar in construction to the first embodiment except that four sheets of oblique baffles 10 are employed to form four spiral flow paths 3. The same reference numerals as used in the preceding figures are employed to indicate the corresponding parts to avoid the necessity for repeating the relevant explanation. In this embodiment, too, the barrel 2 comprises opposed side walls 2a and end walls 2b to have a square cross section. Each oblique baffle 10 is a substantially flat and rectangular plate comprising upper and lower shorter edges of which width is half the width of the side or end walls 2a, 2b of the barrel 2 and opposed side edges of which length is longer than the depth of the barrel 2. Each oblique baffle 10 has one side edge in intimate engagement along its entire length with each of the side or end walls 2a, 2b to be angularly disposed with respect to a longitudinal axis of the barrel 2 with its upper and lower shorter edges in intimate engagement along their entire width with the inner surfaces of the upper and lower portions respectively of the adjacent side or end walls 2a, 2b. Said four oblique baffles 10 are intercrossed at the intermediate portions along the other side edges thereof in such a manner that the upper half of each oblique baffle 10 overlies but spaced from the lower half of the adjacent oblique baffle 10 to provide within the confines of the barrels 2 four congruent flow paths 3 extending generally spirally about said longitudinal axis. Said flow paths 3 have at the upper end of the barrel 2 respective inlets 4 formed respectively between the upper portion of the centrally positioned side edge of one baffle 10 and the upper surface of the adjacent baffle 10 and have at the lower end of the barrel 2 respective outlets 5 formed respectively between the lower portion of the centrally positioned side edge of one baffle 10 and the lower surface of the adjacent baffle 10. When the grease-laden fumes are forcedly drawn into the barrel 2, the grease-laden fumes come to rotate spirally, as passing through the spiral flow paths 3. Therefore, in this embodiment, the grease included in the fumes can be successfully extracted on the same reason as discussed in the first embodiment. In addition, the spiral paths 3 can be fabricated with simple rectangular plates with no complicated cut-away portions as required in the above embodiment.

As for the shape of the barrel, polygonal shapes such as a pentagonal shape or a hexagonal shape may be also adaptable, however, the square-shaped barrel is the most preferable by the following reasons. For the square shaped barrel, the fumes flowing through the spiral paths can encounter the corner portions of the barrel at each of which the radius of the rotating motion of the fumes is abruptly increased so as to produce thereat a turbulent flow, which is most desirable for coagulating the minute grease particles enough to be removed by the centrifugal effect from the fumes, in addition to that such corner portions face against the flow of the fumes so as to have the grease particles deposited thereon, thus increasing grease extraction efficiency. Besides the above, when the square-shaped barrel is employed, a plurality of barrels can be arranged side by side in a row within the ventilating duct of the kitchen ventilating equipment, which makes required space for the installation of the grease extractor to be minimum. Therefore, the employment of the square-shaped barrel is the most practical.

Although the present invention has been described in its preferred embodiments, it should be understood by those skilled in the art that the present invention is not limited to the present embodiments and that various changes and modifications may be made without departing from the scope of the present invention.

What is claimed is:

1. A grease extractor for use in a forced air ventilating system which comprises:
 a barrel having a longitudinal axis;
 a pair of oblique baffles disposed within the barrel said baffles comprising opposed side and opposed end walls and having square cross section, each oblique baffle being a substantially flat plate with upper and lower straight edges, a straight side edge and a notched side edge, the upper and lower edges of each oblique baffle being in intimate engagement with the inner surfaces of the respective opposed end walls, the straight side edge of each oblique baffle being in intimate engagement with the inner surface of each of the opposed side walls, and the apex of the notched side edge of one oblique baffle being crossed with that of the other oblique baffle at the longitudinal axis in such a manner that the baffles are angularly displaced with one another and that the upper half of one oblique baffle overlies but is spaced from the lower half of the other oblique baffle whereby to provide within the confines of the barrel a pair of congruent flow paths extending downwardly and spirally about the longitudinal axis, said flow paths having respective inlets at the upper end of the barrel which are angularly spaced about the longitudinal axis and having respective outlets at the lower end of the barrel which are angularly spaced about the longitudinal axis, said inlets being formed respectively between the upper notched edge of one baffle and the upper surface of the other baffle, and said outlet being formed respectively between the lower notched edge of one baffle and the lower surface of the other baffle.

2. The grease extractor as set forth in claim 1, wherein the oblique baffles are provided at their apexes with locking eyes which are engaged with one another for locking the baffles in a predetermined angular relationship.

3. The grease extractor as set forth in claim 1, wherein said oblique baffles are formed at their lower portion with troughs which slope downwardly along the inner surfaces of the corresponding end walls, the upper end of each trough being continuous with one of the side walls and the lower end of each trough being spaced from the other side wall to define therebetween a drain opening.

4. A range ventilator comprising:
a housing with a front opening and an exhaust duct;
a ventilating duct formed within the housing to comprise a downward flow course leading from said front opening and an upward flow course leading from the lower end of said downward flow course and terminating in said exhaust duct;
forced air generating means provided on the side of the exhaust duct for drawing grease-laden fumes into said ventilating duct through the front opening;
a grease extractors arranged in side by side relationship to extend over the entire width of the downward flow course, said grease extractors having their inlets facing upwardly and outlets facing downwardly;
each of said grease extractors comprising:
a barrel having a longitudinal axis;
a pair of oblique baffles disposed within the barrel said baffles comprising opposed side and opposed end walls and having square cross section, each oblique baffle being a substantially flat plate with upper and lower straight edges, a straight side edge and a notched side edge, the upper and lower edges of each oblique baffle being in intimate engagement with the inner surfaces of the respective opposed end walls, the straight side edges of each obique baffle being in intimate engagement with the inner surfaces of each of the opposed side walls, and the apex of the notched side edge of one oblique baffle being crossed with that of the other oblique baffle at the longitudinal axis in such a manner that the baffles are angularly displaced with one another and that the upper half of one oblique baffle overlies but is spaced from the lower half of the other oblique baffle whereby to provide within the confines of the barrel a pair of congruent flow paths extending downwardly and spirally about the longitudinal axis, said flow paths having respective inlets at the upper end of the barrel which are angularly spaced about the longitudinal axis and having respective outlets at the lower end of the barrel which are angularly spaced about the longitudinal axis, said inlets being formed respectively between the upper notched edge of one baffle and the upper surface of the other baffle, and said outlet being formed respectively between the lower notched edge of one baffle and the lower surface of the other baffle;
a deflector member extending upwardly and forwardly from the rear and upper end of said front opening; and
an entrance baffle extending in the opposite direction to the deflector member from the lower edge of said front opening but terminating in a position spaced forwardly from the deflector member so as to provide an entrance opening inwardly of the front opening.

5. The ventilator as set forth in claim 4, wherein said grease extractors having walls common to the adjacent ones of the grease extractors.

6. The ventilator as set forth in claim 4, wherein said upward flow course is provided with a plurality of deflector angles which are staggered on opposite faces thereof so as to provide a tortuous flow course leading to the exhaust duct.

7. The ventilator as set forth in claim 4, wherein a washing spray means are incorporated in the housing for spraying washing liquid on the surfaces of the housing including those of the grease extractors.

* * * * *